(12) United States Patent
Chen

(10) Patent No.: US 7,848,827 B2
(45) Date of Patent: Dec. 7, 2010

(54) APPARATUS, SYSTEM, AND METHOD FOR WIRELESS DIAGNOSTICS

(75) Inventor: Yu-Gene T. Chen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 348 days.

(21) Appl. No.: 11/394,948

(22) Filed: Mar. 31, 2006

(65) Prior Publication Data
US 2007/0233283 A1    Oct. 4, 2007

(51) Int. Cl.
*G05B 11/01*    (2006.01)
(52) U.S. Cl. .......................... 700/19; 702/183; 340/3.1
(58) Field of Classification Search ............... 700/1, 700/9, 20, 83, 17, 37, 79, 282, 19, 26; 702/183, 702/188; 340/3.1, 508; 370/466
See application file for complete search history.

(56) References Cited

U.S. PATENT DOCUMENTS

| | | | |
|---|---|---|---|
| 5,793,963 A | 8/1998 | Tapperson et al. | |
| 6,587,900 B1 * | 7/2003 | Wischinski | 710/68 |
| 6,629,059 B2 * | 9/2003 | Borgeson et al. | 702/183 |
| 6,859,755 B2 * | 2/2005 | Eryurek et al. | 702/183 |
| 6,904,476 B2 * | 6/2005 | Hedtke | 710/72 |
| 6,959,356 B2 * | 10/2005 | Packwood et al. | 710/315 |
| 7,010,294 B1 * | 3/2006 | Pyotsia et al. | 455/420 |
| 7,117,122 B2 * | 10/2006 | Zielinski et al. | 702/183 |
| 7,234,084 B2 * | 6/2007 | Franchuk et al. | 714/47 |
| 7,262,693 B2 * | 8/2007 | Karschnia et al. | 340/508 |
| 7,386,052 B2 * | 6/2008 | Kresse et al. | 375/245 |
| 7,426,452 B2 * | 9/2008 | Zielinski et al. | 702/184 |
| 7,436,797 B2 * | 10/2008 | Shepard et al. | 370/328 |
| 7,496,473 B2 * | 2/2009 | Lenz et al. | 702/183 |

(Continued)

FOREIGN PATENT DOCUMENTS

DE    10000609 A1    7/2001

(Continued)

OTHER PUBLICATIONS

S. Cavalieri, et al., "On the Integration of Fieldbus Traffic Within IEEE 802.11 Wireless LAN", 1997 IEEE, p. 131-138.

(Continued)

*Primary Examiner*—Albert Decady
*Assistant Examiner*—Dave Robertson
(74) *Attorney, Agent, or Firm*—Munck Carter, LLP

(57) ABSTRACT

A diagnostic concentrator includes a first interface that is capable of receiving a signal sent from a field device to a process controller. The signal includes a primary process variable and additional information. The diagnostic concentrator also includes a controller that is capable of generating a message corresponding to the received additional information and a second interface that is capable of transmitting the generated message. The first interface may be a HART interface. The second interface may be a wireless interface or a network interface. The message may be transmitted to a diagnostic monitor or a process controller. The first interface may receive a plurality of signals sent from a plurality of field devices to the process controller. The controller may generate a plurality of messages corresponding to the plurality of additional information in the signals and transmit the messages via the second interface.

20 Claims, 3 Drawing Sheets

U.S. PATENT DOCUMENTS

| | | | |
|---|---|---|---|
| 7,557,702 B2 * | 7/2009 | Eryurek et al. | 340/511 |
| 7,609,660 B2 * | 10/2009 | Tapperson et al. | 370/310 |
| 7,640,007 B2 * | 12/2009 | Chen et al. | 455/414.1 |
| 2002/0077711 A1 * | 6/2002 | Nixon et al. | 700/51 |
| 2002/0090001 A1 | 7/2002 | Beckwith | |
| 2004/0259533 A1 * | 12/2004 | Nixon et al. | 455/414.1 |
| 2005/0164684 A1 | 7/2005 | Chen et al. | |
| 2005/0276233 A1 | 12/2005 | Shepard et al. | |
| 2005/0289276 A1 * | 12/2005 | Karschnia et al. | 710/305 |
| 2006/0075009 A1 * | 4/2006 | Lenz et al. | 708/160 |
| 2007/0118233 A1 * | 5/2007 | Kresse et al. | 700/11 |
| 2007/0237137 A1 | 10/2007 | McLaughlin | |
| 2009/0102601 A1 * | 4/2009 | Mathiesen et al. | 340/3.1 |

FOREIGN PATENT DOCUMENTS

| | | | |
|---|---|---|---|
| WO | WO02/05199 A1 | 1/2002 | |
| WO | WO2004/042674 A1 | 5/2004 | |
| WO | WO2005/086110 A2 | 9/2005 | |
| WO | WO2006/007521 A1 | 1/2006 | |

OTHER PUBLICATIONS

Suk Lee, et al., "Integration of Mobile Vehicles for Automated Material Handling Using Profibus and IEEE 802.11 Networks", IEEE Transactions on Industrial Electronics, vol. 49, No. 3, Jun. 2002, p. 693-701.

Andreas Willig, et al., "Wireless Technology in Industrial Networks", Proceedings of the IEEE, vol. 93, No. 6, Jun. 2005, p. 1130-1151.

Amendment and Response to Office Action filed on Jan. 21, 2009 in connection with U.S. Appl. No. 11/394,947.

* cited by examiner

APPARATUS, SYSTEM, AND METHOD FOR WIRELESS DIAGNOSTICS

TECHNICAL FIELD

This disclosure relates generally to distributed control systems and more specifically to an apparatus, system, and method for wireless diagnostics.

BACKGROUND

A process plant is typically a complex, multifaceted entity, such as a structured organization of physical elements operated for economic and other criteria that are often industry-specific. A process plant often has a number of different stakeholders who can affect its operation and/or who are affected by its operation. Critical to the operation of many process plants today is a process control system, which ensures that appropriate parameters are measured and actions taken, plant personnel are kept informed, abnormal situations are identified and addressed, and business processes are integrated. Automation and control systems are employed in diverse applications, such as refining and petrochemical plants, petroleum and natural gas supply chains, pulp and paper manufacturing, electrical power generation, chemical production, food production, wastewater treatment, discrete product manufacturing, cable-laying ships, tunnel ventilation control, and mining operations.

A process control system typically includes a process controller in communication with field devices such as process sensors, process actuators, and user interfaces. The process controller may receive measured values of process variables from the process sensors and may control positions of process actuators to maintain the process variables within desired ranges. Various communication protocols between a process controller and its nodes have been developed. As new communication protocols are developed, process controllers may be upgraded to support these new communication protocols.

Field devices utilizing new communication protocols, however, may be "backwards compatible." That is, a process controller that has not been upgraded may be able to communicate with such a field device at some minimal level, without being able to utilize the full functionality of the field device.

Field devices utilizing new communication protocols may be added to existing process control systems without upgrading a process controller for several reasons. Upgrading a process controller or associated circuitry to support a new communication protocol may require shutting down operation of all or a significant part of a process plant while upgrades are made. Upgrading the process controller or associated circuitry may also be considered too expensive.

SUMMARY

This disclosure provides an apparatus, system, and method for wireless diagnostics.

In a first embodiment, an apparatus includes a first interface that is capable of receiving a signal sent from a field device to a process controller. The signal includes a primary process variable and additional information. The apparatus also includes a controller that is capable of generating a message corresponding to the received additional information. In addition, the apparatus includes a second interface that is capable of transmitting the generated message.

In particular embodiments, the first interface is a HART interface. In other particular embodiments, the second interface is a wireless interface or a network interface. In still other particular embodiments, the message is transmitted to a diagnostic monitor or a process controller.

In yet other particular embodiments, the first interface is capable of receiving a plurality of signals sent from a plurality of field devices to the process controller. Each signal includes a primary process variable and additional information. The controller is also capable of generating a plurality of messages that correspond to the plurality of additional information in the plurality of received signals. The second interface is also capable of transmitting the plurality of messages.

In a second embodiment, a system includes a field device and a process controller capable of communicating with the field device via a field device protocol communication link. The system also includes a diagnostic concentrator that is capable of receiving a signal sent by the field device to the process controller. The signal includes a primary process variable and additional information. The diagnostic concentrator is also capable of transmitting a message corresponding to the additional information.

In a third embodiment, a method includes receiving a signal sent by a field device to a process controller. The signal includes a primary process variable and additional information. The method also includes sending a message corresponding to the additional information in the received signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
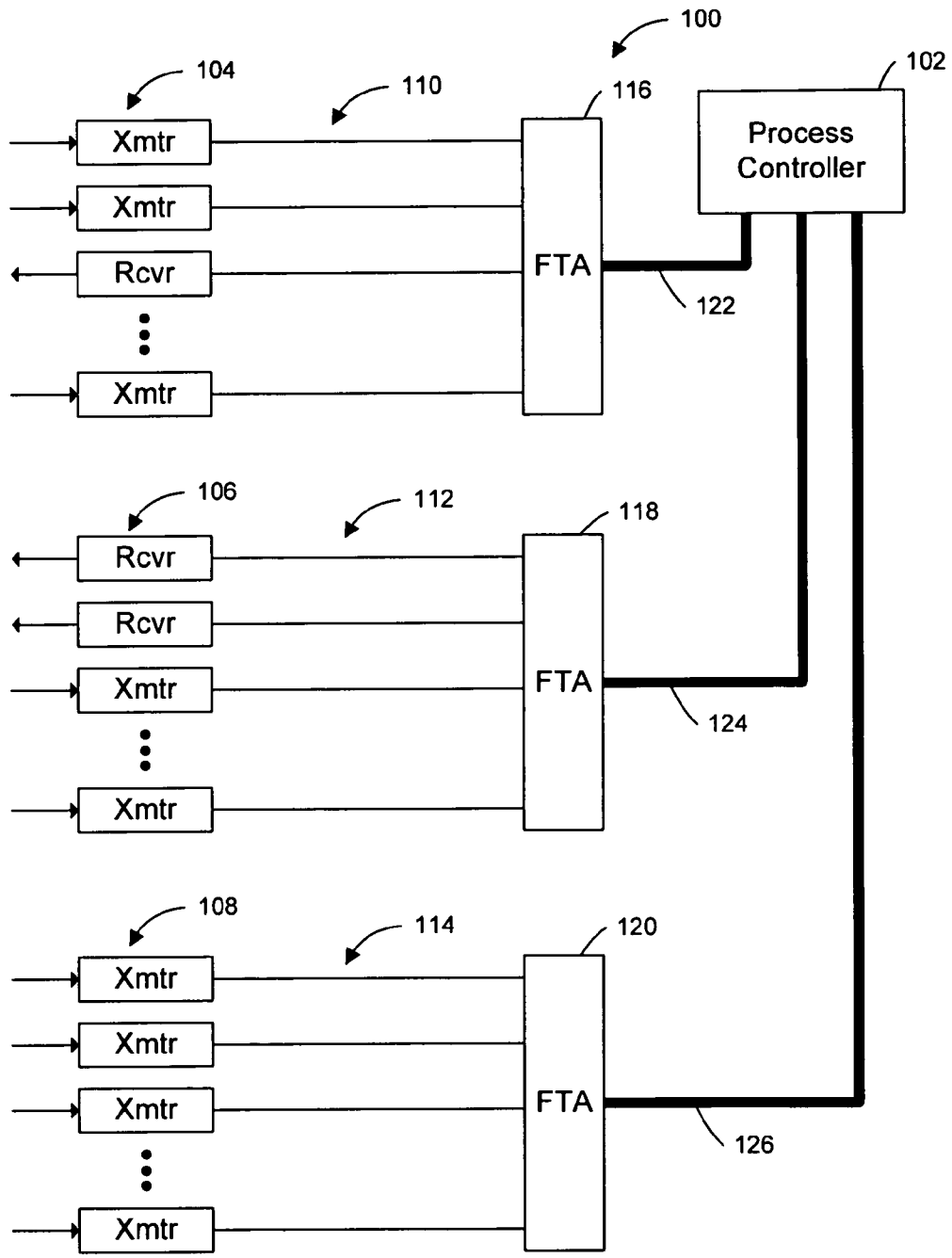
FIG. 1 illustrates an example system for distributed process control.

FIG. 1 illustrates an example system 100 for process control. A process controller 102 may communicate with groups 104-108 of field devices. A field device may represent, for example, a process transmitter or a process receiver. A process transmitter may measure at an input an analog voltage that is proportional to a process variable, such as a pressure sensed by a pressure transducer. The measured process variable value may be referred to as a primary process variable. The process transmitter may produce on an output a signal proportional to the voltage on the input, such as an analog current. In contrast, a process receiver may receive a signal from the process controller 102 on an input. The signal on the input may be proportional to, for example, a desired position of a valve.

Outputs of the process transmitters and inputs of the process receivers in the groups 104-108 may be coupled to the process controller 102 by wire pairs 110-114 via field termination assemblies (FTAs) 116-120. In some embodiments, as many as 32 field devices may be coupled to a single FTA. The FTAs 116-120 are typically electrically connected to the process controller 102 by multi-conductor cables 122-126. An FTA typically includes circuitry to process the signals sent to/from the process controller 102. Thus, a process controller may communicate with field devices such as process transmitters and receivers via individual dedicated links between the process controller and each node.

Each of the signals on the wire pairs 110-114 may be, for example, an analog current in the range of 4-20 milliamps. Secondary information may also be communicated between the process controller 102 and the groups 104-108 of field devices using one or more field device protocols, such as the Highway Addressable Remote Transducer (HART) protocol. In a HART protocol communication link, a second channel is superimposed over the analog current as a low voltage, low current, and high frequency signal component. The second channel is encoded as binary frequency shift keying (FSK), in which a 1,200 Hz frequency represents a binary one and a 2,200 Hz frequency represents a binary zero.

In the HART protocol, either end of a communication link may transmit secondary information to the other end by way of the FSK channel. For example, a process transmitter may transmit values of a secondary process variable, such as pump body temperature, to the process controller 102. The process controller 102 may transmit calibration commands to a process transmitter. The process controller 102 may also transmit a request for maintenance information to a process receiver and receive an indication of a number of hours of operation since the last maintenance of the actuator from the process receiver.

Alternatively, the process controller 102 may use any other or additional field device protocol or protocols to communicate with field devices. Other field device protocols include Foundation Fieldbus H1, Modbus, Profibus, and WorldFIP.

Field device communication protocols typically provide for the communication of not only process variables, but diagnostic messages as well. Either a process transmitter or a process receiver may send diagnostic messages to the process controller 102. Such messages may include information about the operating condition of the field device, such as: out of range process variable (primary, secondary, tertiary or quaternary); field device hardware malfunction; additional status available; primary variable analog output fixed; and primary variable analog output saturated.

However, field devices capable of transmitting, for example, HART diagnostic messages may be installed into a control system 100 employing only analog current signaling between process controller 102 and the groups 104-108 of field devices. Such field devices will be able to operate at a minimal level of functionality, since they can transmit or receive analog current signals as required by the process controller 102. Similarly, where the process controller 102 communicates with the groups 104-108 of field devices using another protocol, newly installed devices may be capable of sending diagnostic messages that the process controller 102 is not capable of displaying or otherwise utilizing. To make full use of such new field devices' capabilities, modification of both the process controller 102 and the FTAs 116-120 may be required.

Such modifications will typically require capital expenditures for new equipment and may require shutting down all or significant portions of the process being controlled. Furthermore, receipt of diagnostic messages may be required from only a relatively small percentage of the field devices, creating further difficulties in justifying major changes to the rest of the process control system 100.

Figure 2:
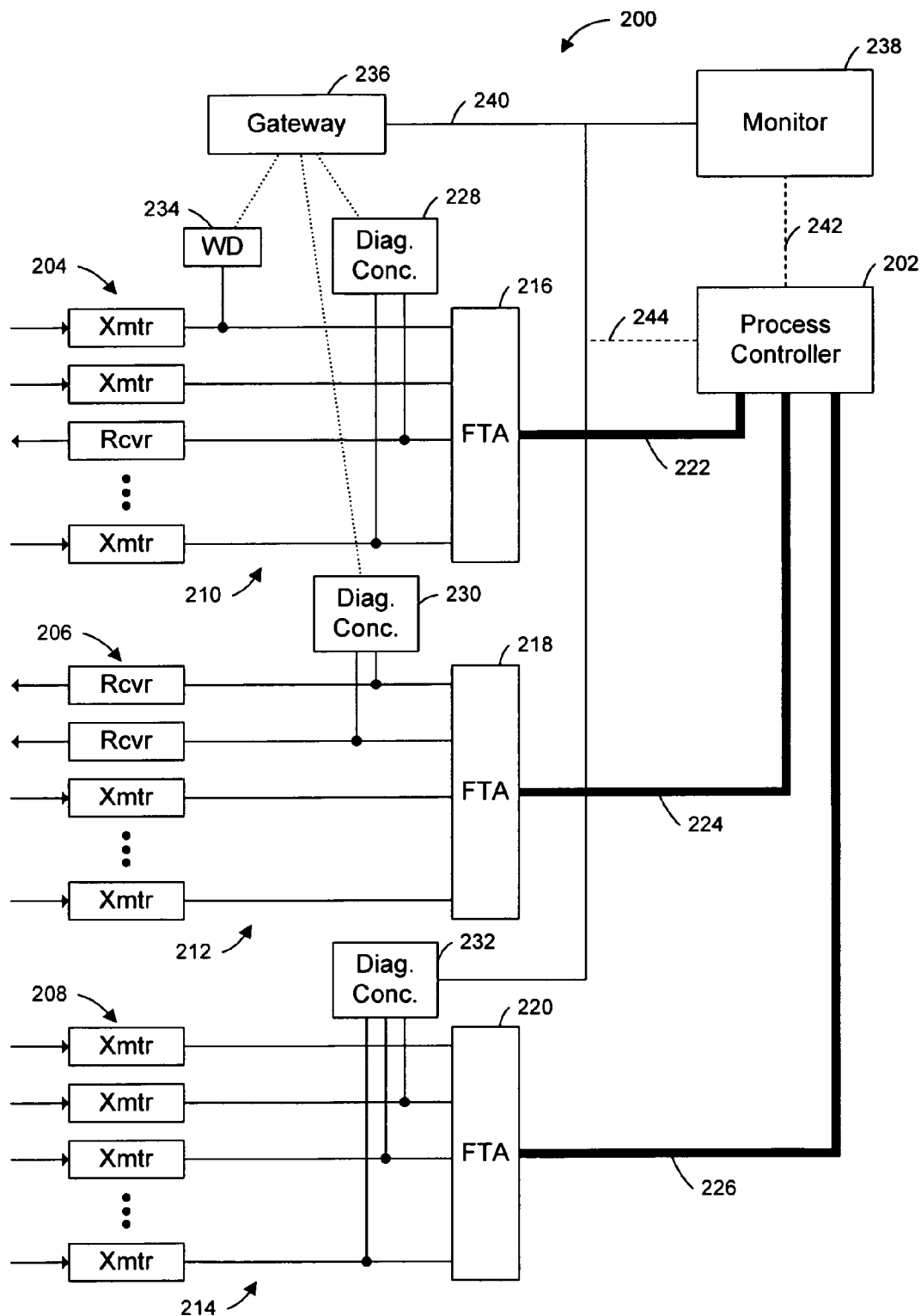
FIG. 2 illustrates an example system for distributed process control according to one embodiment of this disclosure.

FIG. 2 illustrates an example system 200 for distributed process control according to one embodiment of this disclosure. A process controller 202 communicates with groups 204-208 of field devices via multi-conductor cables 222-226, FTAs 216-220, and groups 210-214 of wire pairs. For purposes of describing example embodiments of this disclosure, the addition of HART protocol field devices to an analog current control system will be used for illustrative purposes. It will be understood, however, that communication links utilizing other field device protocols may be employed without departing from the scope of this disclosure.

Where field devices capable of sending HART diagnostic messages are added to the groups 204-208 of field devices, diagnostic concentrators 228-232 may be added to the control system 200. The diagnostic concentrators 228-232 may electrically connect in parallel to the wire pair coupling a HART-capable field device to a FTA. In this way, the diagnostic concentrator 228, for example, is capable of receiving a signal containing both an analog current being sent between the field device and the process controller 202, as well as an FSK channel communicating HART diagnostic information sent by the field device. The diagnostic concentrator 228 may then generate a message containing the diagnostic information and transmit the message wirelessly to a wireless gateway 236. The wireless gateway may then transmit the message to a diagnostic monitor 238 via a network 240, such as a TCP/IP or Ethernet network.

Similarly, the diagnostic concentrator 230 may be coupled to field devices in the group 206 that send HART diagnostic information, and the diagnostic concentrator 230 may transmit messages containing that information to the diagnostic monitor 238 via the wireless gateway 236. In contrast, the diagnostic concentrator 232 may be coupled directly to the network 240. In this way, the diagnostic concentrator 232 is capable of transmitting diagnostic information messages from the signals of HART-capable field devices in the group 208 directly to the diagnostic monitor 238. In other embodiments, the diagnostic monitor 238 may be capable of wireless communication and, thus, be capable of directly receiving the diagnostic information messages transmitted wirelessly by the diagnostic concentrators 228 and 230.

By locating the diagnostic concentrators 228-232 in proximity to the FTAs 216-220, respectively, each diagnostic concentrator may be used to collect diagnostic information from a plurality of field devices. Indeed, a diagnostic concentrator may be located inside an equipment cabinet housing a FTA and coupled either to a wireless antenna or to a network connector located in a wall of the cabinet. However, a wireless device 234 may also be located in proximity to a field device. Like the diagnostic concentrators 228 and 230, such a wireless device is capable of electrically connecting to the wire pair coupling the field device to the FTA 216, generating messages corresponding to diagnostic information sent by the field device, and wirelessly transmitting the messages to the diagnostic monitor 238 via the wireless gateway 236. However, the wireless device 234 may only collect diagnostic information from a single field device.

In order to interpret the HART diagnostic messages sent by a field device, the wireless device 234 and the diagnostic concentrators 228-232 must be configured with information about a HART device, such as the device address, so that the device requests from the application (control system or monitoring system or software program) are routed to the appropriate field device by the gateway 236, the diagnostic concentrators 228-232, or the wireless device 234.

HART 'device descriptor' is information published, typically, by manufacturers of HART-capable devices to enable process controller manufacturers to effectively utilize their field devices. A configuration tool coupled to the network 240 may be used to configure the groups 204-208 of HART field devices and the diagnostic concentrators 228-232 with information from the device descriptors for the field devices to be monitored for diagnostic information. The configuration tool may communicate with the group 208 of field devices via the diagnostic concentrator 232 and the network 240. The configuration tool may communicate with the groups 204 and 206 of field devices via the wireless device 234 and the diagnostic concentrators 228 and 230 via the wireless gateway 236.

The diagnostic concentrators 228-232 and the wireless device 234 may be used in several circumstances. The process controller 202 and the FTAs 216-220 may be unable to process diagnostic information sent by newly installed field devices. The process controller 202 may be capable of processing diagnostic information, but the field devices providing the information may be connected via a FTA that is not capable. Where a field device communication protocol in which primary process variable and diagnostic information messages are sent in the same format (for example, Foundation Fieldbus H1), the process controller 202 may not be capable of processing the diagnostic information that the FTAs 216-220 are forwarding.

Furthermore, the process controller may be limited to Level 1 closed loop process control while a separate processing platform is desired for Level 2 statistical process control or Level 3 optimization, historian, or maintenance monitoring applications. Finally, the process controller 202 and the FTAs 216-220 may be capable of processing the diagnostic information, but all of the processing power of the process controller 202 may be utilized in executing process control algorithms, with no processing power available to perform diagnostic monitoring functions.

In various ones of these circumstances, other embodiments of the present disclosure may be possible, as indicated in FIG. 2 by alternate couplings 242 and 244. The process controller 202 may have a network interface and be capable of receiving and processing diagnostic information collected by the diagnostic concentrators 228-232 and the wireless device 234. In this way, the wireless gateway 236 and the diagnostic concentrator 232 may be coupled directly to the process controller 202, as shown at 244. Where Level 1, Level 2 and Level 3 processing is distributed between the process controller 202 and the diagnostic monitor 238, the wireless gateway 236 may decide where to send received diagnostic information based upon the nature or identity of the received information.

Where the process controller 202 is either incapable of receiving, or too overloaded to process, collected diagnostic information, the diagnostic monitor 238 may receive and process the information. The diagnostic monitor 238 may have a user interface by which it alerts a system operator when a condition arises requiring action by the system operator, such as when a process variable is out of range or when a field device is reporting an operational failure. In another embodiment of the present disclosure, as indicated at 242, the diagnostic monitor 238 may be communicatively coupled to the process controller 202. In this way, alerts and failure warnings sensed by the diagnostic monitor 238 may be signaled to the process controller 202 and displayed to a system operator via the user interface of the process controller 202.

Although FIG. 2 illustrates one example of a system 200 for distributed process control, various changes may be made to FIG. 2. For example, the system 200 could include any number of process controllers, field termination assemblies, diagnostic concentrators, diagnostic monitors, wireless gateways, wireless devices, and field devices.

Figure 3:
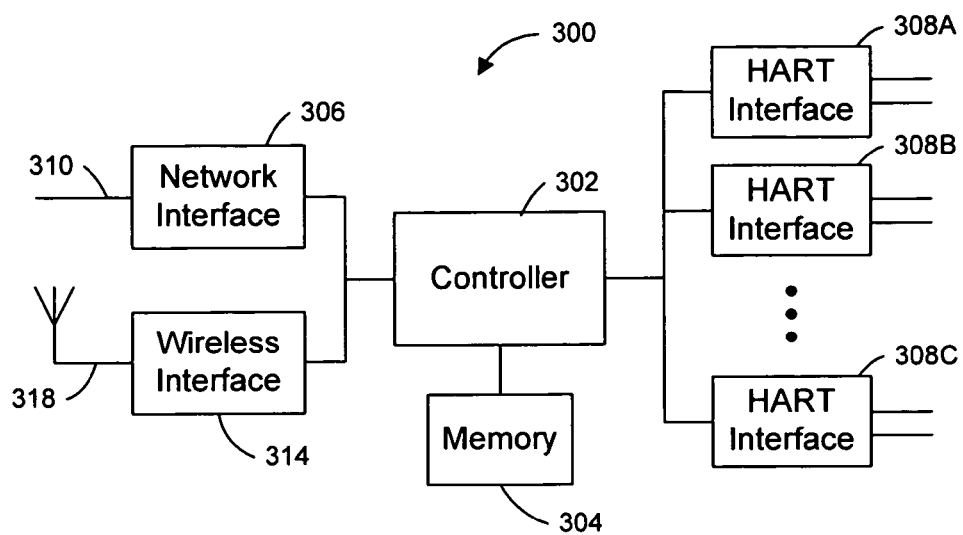
FIG. 3 illustrates an example diagnostic concentrator according to one embodiment of this disclosure.

FIG. 3 illustrates an example diagnostic concentrator 300 according to one embodiment of this disclosure. The concentrator 300 may include a controller 302 coupled to a memory 304. The memory 304 may store instructions for execution by the controller 302 and data used during execution of the instructions. The controller 302 may communicate with, for example, other devices on the network 240 of FIG. 2 via a network interface 306 and a network connection 310. The concentrator 300 may also communicate with, for example, the wireless gateway 236 of FIG. 2 via a wireless interface 314 and an antenna 318.

The diagnostic concentrator 300 may couple to, for example, one or more HART protocol communication links in the wire pair group 214 of FIG. 2 via HART interfaces 308A-308C. Where a process controller and field devices communicate using only an analog current, the HART interfaces 308A-308C may both transmit and receive information in the FSK channel to/from field devices. Where HART protocol communication is already in use in a process control system, the HART interfaces 308A-308C may only receive the FSK channel.

Each of these components includes any suitable hardware, software, firmware, or combination thereof for performing the desired functions. For example, the controller 302 could represent a digital signal processor, and the memory 304 could represent one or more volatile and/or non-volatile storage and retrieval devices. The network interface 306 could represent an Ethernet network interface or other network interface. The HART interfaces 308A-308C could represent circuitry for communicating over wire pairs in the groups 210-214.

Although FIG. 3 illustrates one example of a diagnostic concentrator 300, various changes may be made to FIG. 3. For example, the diagnostic concentrator 300 could include any number of controllers, memories, network interfaces, wireless interfaces, and HART interfaces. In addition, the HART interfaces 308A-308C could be replaced by interfaces supporting any other suitable field device protocols.

Figure 4:
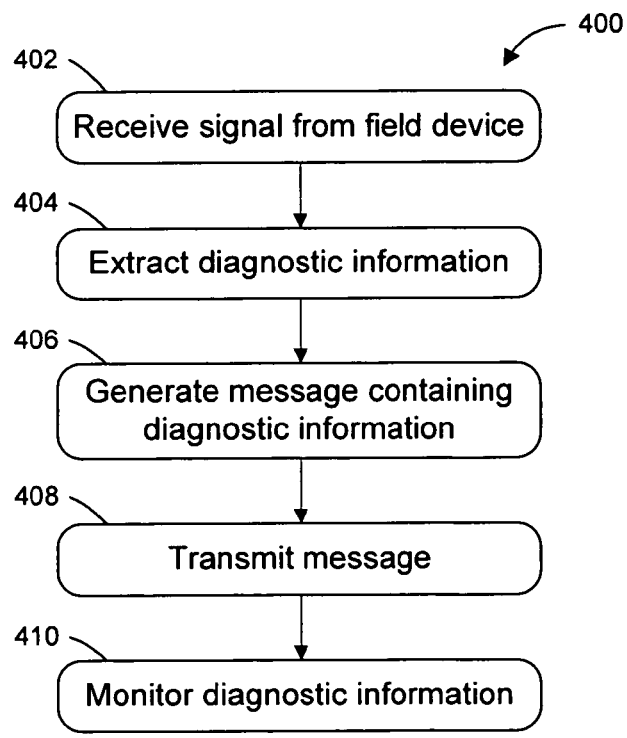
FIG. 4 illustrates an example method for monitoring diagnostic data transmitted by a field device according to one embodiment of this disclosure.

FIG. 4 illustrates an example method 400 for monitoring diagnostic data transmitted by a field device according to one embodiment of this disclosure. The method 400 is described with reference to the process control system 200 of FIG. 2 and the diagnostic concentrator 228 of FIG. 3. In step 402, a diagnostic concentrator 228 receives a signal sent by a field device in the group 204 to the process controller 202. Where the field devices are communicating with the process controller 202 using the HART protocol, the received signal is an analog current communicating a primary process variable and a superimposed FSK channel communicating additional information. Where the Foundation Fieldbus H1 protocol is being used, both the primary process variable and any additional information are in digital format.

In step 404, the diagnostic concentrator extracts from the signal received in the step 402 any diagnostic information and, in step 406, generates a message containing that diagnostic information. In step 408, the diagnostic concentrator transmits the message by one or both of the network interface 306 and the wireless interface 314. The message may be transmitted to the diagnostic monitor 238 or to the process controller 202. The steps 402-408 may be performed as needed to handle signals received on one or more of the HART interfaces 308A-308C.

In step 410, the diagnostic monitor 238 or the process controller 202 receives the diagnostic information messages transmitted by the diagnostic concentrator 228. The information is monitored or analyzed for process variables out of range, field devices reporting an operational failure, or other conditions requiring action by a system operator.

As used herein, the term "wireless" communication indicates the transmission of data via an ambient medium, for example, air. A non-wireless communication includes a communication achieved by transmission of data via a physical conduit, channel, or other communication path. Examples of such physical communication paths for non-wireless communication include copper or other conductive wires, optical fibers, coaxial and other cables, and any of a plethora of other known (or to be developed) communication or transmission lines. No specific structure is implied by either term (wireless or non-wireless), nor is the use of a particular band of frequencies, wavelengths, bit rates, or modulation protocols implied.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same (such as a processor, ASIC, FPGA, or other device that operates using software or firmware instructions). The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a plurality of first interfaces configured to receive signals sent from a plurality of field devices to a process controller when electrically connected in parallel to a plurality of field device protocol communication links coupling the field devices and the process controller without preventing delivery of the signals to the process controller, each of the signals comprising a first signal representing primary process variable information and a second signal representing field device diagnostic information;
a controller configured to extract the field device diagnostic information from the signals and to generate messages containing the field device diagnostic information but not the primary process variable information; and
a common second interface configured to transmit the messages containing the field device diagnostic information to an external destination over a distinct communication path that does not include the field device protocol communication links.

2. The apparatus of claim 1, wherein the second interface comprises one of: a wireless interface and a network interface with which the messages containing the field device diagnostic information are sent to the external destination.

3. The apparatus of claim 1, wherein the second interface is configured to transmit the messages to a destination other than the process controller.

4. The apparatus of claim 1, wherein the field device protocol communication links comprise HART communication links.

5. The apparatus of claim 1, wherein the second interface is configured to transmit the messages to the process controller.

6. The apparatus of claim 1, wherein the second interface is configured to transmit the messages to a diagnostic monitor.

7. The apparatus of claim 1, wherein the first interfaces are configured to be coupled to the field device protocol communication links between the field devices and a field termination assembly coupled to the process controller, the field termination assembly configured to handle the primary process variable information but not configured to handle the field device diagnostic information.

8. A system, comprising:
a plurality of field devices;
a process controller configured to communicate with the field devices via a plurality of field device protocol communication links coupling the field devices and the process controller; and
a diagnostic concentrator comprising:
a plurality of first interfaces configured to receive signals sent by the field devices to the process controller when electrically connected in parallel to the field device protocol communication links without preventing delivery of the signals to the process controller, each of the signals comprising primary process variable information and field device diagnostic information, the primary process variable information traversing first paths that include the field device protocol communication links from the field devices to the process controller;
a controller configured to extract the field device diagnostic information from the signals and to generate messages containing the field device diagnostic information but not the primary process variable information; and
a common second interface configured to transmit the messages containing the field device diagnostic information from the plurality of field devices to an external destination over a second and distinct path that does not include the field device protocol communication links.

9. The system of claim 8, wherein the second interface comprises one of: a wireless interface and a network interface with which the messages containing the field device diagnostic information are sent to the external destination.

10. The system of claim 8, wherein the diagnostic concentrator is configured to transmit the messages to a destination other than the process controller.

11. The system of claim 8, wherein the field device protocol communication links comprise HART communication links.

12. The system of claim 8, wherein the diagnostic concentrator is configured to transmit the messages to the process controller.

13. The system of claim 8, wherein:
the diagnostic concentrator is configured to transmit the messages to a diagnostic monitor;
the field devices are configured to transmit the signals using a standard communication protocol; and
the diagnostic concentrator is configured to receive the signals and transmit the messages without interfering with the transmission of the primary process variable information to the process controller.

14. The system of claim 8, wherein the first interfaces are configured to be coupled to the field device protocol communication links between the field devices and a field termination assembly coupled to the process controller, the field termination assembly configured to handle the primary process variable information but not configured to handle the field device diagnostic information.

15. A method, comprising:
   receiving signals sent by a plurality of field devices to a process controller at a diagnostic concentrator having a plurality of first interfaces electrically connected in parallel to a plurality of field device protocol communication links coupling the field devices and the process controller without preventing delivery of the signals to the process controller, each of the signals comprising primary process variable information and field device diagnostic information;
   extracting the field device diagnostic information from the signals;
   generating messages containing the field device diagnostic information but not the primary process variable information; and
   transmitting the messages containing the field device diagnostic information from the plurality of field devices to an external destination using a common second interface of the diagnostic concentrator, the messages transmitted along a distinct communication path that does not include the field device protocol communication links.

16. The method of claim 15, wherein the messages are transmitted via one of: a wireless communication link and a network interface to the external destination.

17. The method of claim 15, wherein the field device protocol communication links comprise HART communication links.

18. The method of claim 15, wherein the messages are transmitted to the process controller.

19. The method of claim 15, wherein:
   the primary process variable information and the field device diagnostic information are transmitted using a common format;
   the process controller does not support a protocol associated with the field device diagnostic information and is unable to process the field device diagnostic information; and the messages are transmitted to a diagnostic monitor.

20. The method of claim 15, wherein the first interfaces are coupled to the field device protocol communication links between the field devices and a field termination assembly coupled to the process controller, the field termination assembly handling the primary process variable information but not handling the field device diagnostic information.

* * * * *